(12) United States Patent
Hoffman et al.

(10) Patent No.: US 8,129,872 B2
(45) Date of Patent: *Mar. 6, 2012

(54) LOW PROFILE D.C. BRUSHLESS MOTOR FOR AN IMPELLER MECHANISM OR THE LIKE

(75) Inventors: Leslie C. Hoffman, Westwood, CA (US); Barton J. Kenyon, Leichhardt (AU); David B. Sears, Woodland Hills, CA (US)

(73) Assignee: Resmed Motor Technologies Inc., Chatsworth, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/891,067

(22) Filed: Sep. 27, 2010
(Under 37 CFR 1.47)

(65) Prior Publication Data

US 2011/0014074 A1    Jan. 20, 2011

Related U.S. Application Data

(63) Continuation of application No. 11/362,198, filed on Feb. 27, 2006, now Pat. No. 7,804,213, which is a continuation of application No. 10/795,207, filed on Mar. 5, 2004, now Pat. No. 7,012,346.

(60) Provisional application No. 60/453,038, filed on Mar. 7, 2003.

(51) Int. Cl.
*F04D 13/06* (2006.01)
*H02K 5/08* (2006.01)

(52) U.S. Cl. ............. 310/43; 310/67 R; 310/90; 310/89; 417/423.12; 417/423.7

(58) Field of Classification Search .................... 310/63, 310/43, 89, 90, 67 R; 417/423.7, 423.12, 417/423.14, 420, 354, 358, 423.15; 415/55.1, 415/55.2

See application file for complete search history.

(56) References Cited

U.S. PATENT DOCUMENTS 4,164,690 A    8/1979    Muller et al.
(Continued)

FOREIGN PATENT DOCUMENTS

WO    WO 2005/091469    9/2005

*Primary Examiner* — Karl Tamai
(74) *Attorney, Agent, or Firm* — Nixon & Vanderhye P.C.

(57) ABSTRACT

An impeller and at least a portion of a cooperating peripheral volute may be integrated are integrally injection molded with, concentric outer rotor and inner stator assemblies, respectively, to achieve a low profile precision impeller mechanism based on an improved brushless D.C. motor with low length to diameter ratio and suitable for use in a variety of other applications. A rotating cap has an inner circumference which is molded about an outer ferromagnetic back ring that in turn supports a rotor magnet having a number of poles of alternating polarity and separated by a relatively small cylindrical air gap from a fixed stator assembly. The fixed stator assembly is integrally molded into a base housing having a bearing support that extends upwardly through the center of the stator assembly and that is rotatably coupled to a rotating shaft that extends downwardly from the center of the rotating cap.

13 Claims, 6 Drawing Sheets

U.S. PATENT DOCUMENTS

| | | |
|---|---|---|
| 4,836,147 A | 6/1989 | Morris |
| 5,135,363 A | 8/1992 | Harmsen et al. |
| 5,591,017 A | 1/1997 | Dwyer |
| 6,023,113 A | 2/2000 | Otsuka |
| 6,036,456 A | 3/2000 | Peters et al. |
| 6,065,946 A | 5/2000 | Lathrop |
| 6,359,934 B1 | 3/2002 | Yoshida |
| 6,501,616 B1 | 12/2002 | Neal |
| 6,551,074 B2 | 4/2003 | Kudo et al. |
| 2002/0025261 A1 | 2/2002 | Kudo et al. |
| 2005/0012411 A1 | 1/2005 | Hoffman et al. | ular stack. Additionally, optional features such as ribs, bosses, and sockets may be included in the injection molded motor base housing for providing additional strength and/or for mounting or other attachment to other exemplary assemblies such as a blower or pump assembly.

LOW PROFILE D.C. BRUSHLESS MOTOR FOR AN IMPELLER MECHANISM OR THE LIKE

CROSS RELATED APPLICATION

This application is a continuation of U.S. application Ser. No. 11/362,198 filed Feb. 27, 2006, which is a continuation of and claims priority to U.S. application Ser. Nos. 10/795,207 filed on Mar. 5, 2004 and 60/453,038 filed on Mar. 7, 2003 each of which is incorporated herein by reference in its entirety.

BACKGROUND OF THE INVENTION

The present invention relates generally to d.c. motors and more particularly to an improved d.c. brushless motor having a low length to diameter ratio and suitable for use with a low profile impeller mechanism.

BRIEF SUMMARY OF THE INVENTION

In accordance with a first aspect, an impeller and at least a portion of a cooperating peripheral volute are formed on, and preferably are integrally injection molded with, respective concentric outer rotor and inner stator assemblies, to achieve a low profile precision impeller mechanism based on an improved brushless d.c. motor with low length (L) to diameter (D) ratio.

In accordance with a second aspect, an improved low profile brushless d.c. motor suitable for use in a variety of different applications includes an injection molded rotating cap which has an inner circumference which is molded about an outer ferromagnetic back ring that in turn supports a permanently magnetized ring shaped rotor magnet having a number of poles of alternating polarity defined about its inner circumference and separated by a relatively small cylindrical air gap from the outwardly radially projecting selectively magnetized teeth of a fixed stator assembly. In one exemplary embodiment the rotor may have 8 poles and the stator may have 9 radial slots defining 9 respective teeth. The fixed stator assembly is preferably integrally molded into a base housing that also includes a precision fixed bearing support that extends upwardly through the center of the stator assembly and that is rotatably coupled to a rotating shaft that extends downwardly from (and preferably is integral with) the center of the rotating cap. A coaxial pair of preloaded ball bearings is preferably supported between an inner cylindrical surface of the fixed bearing support and an outer cylindrical surface of the rotating shaft, to thereby permit the rotor to rotate precisely about the stator with minimal variation in the cylindrical air gap therebetween.

BRIEF DESCRIPTION OF THE DRAWINGS

Hereinafter, some exemplary embodiments of the present invention will be described in reference to the attached drawings, which are not necessarily to scale and which include reference labels to indicate various features thereof, like labels referring to like features throughout both the drawings and the written description. A description of one or more preferred or otherwise exemplary embodiments is not to be taken in a limiting sense, but is made merely for the purpose of describing the general principles of the invention. Additional embodiments, features and/or advantages of the invention will become apparent from the ensuing description or may be learned by the practice of the invention.

DETAILED DESCRIPTION OF THE INVENTION

Figure 1:
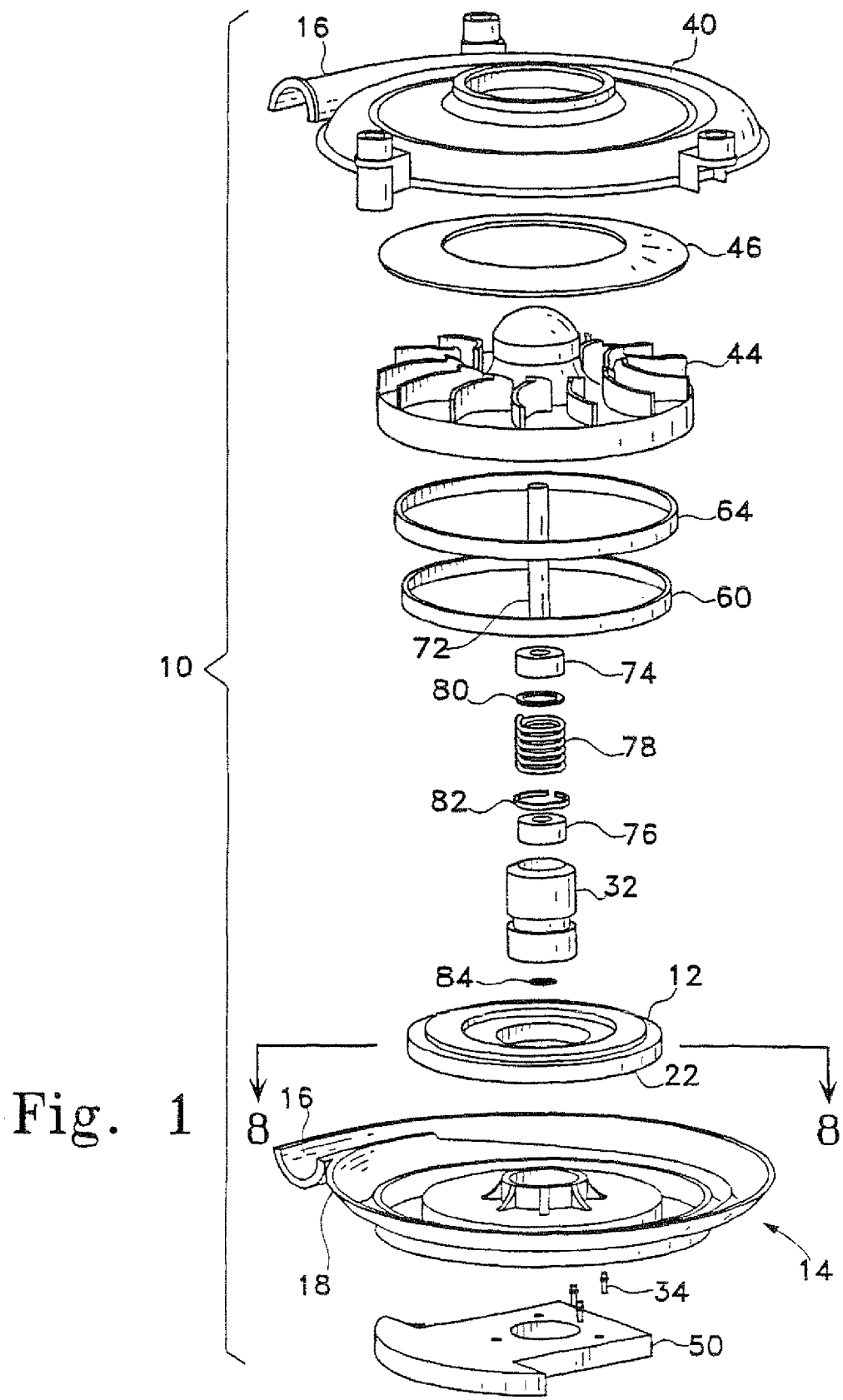
FIG. 1 is a first exploded perspective view of an exemplary d.c. brushless motor in accordance with the present invention.
Figure 2:
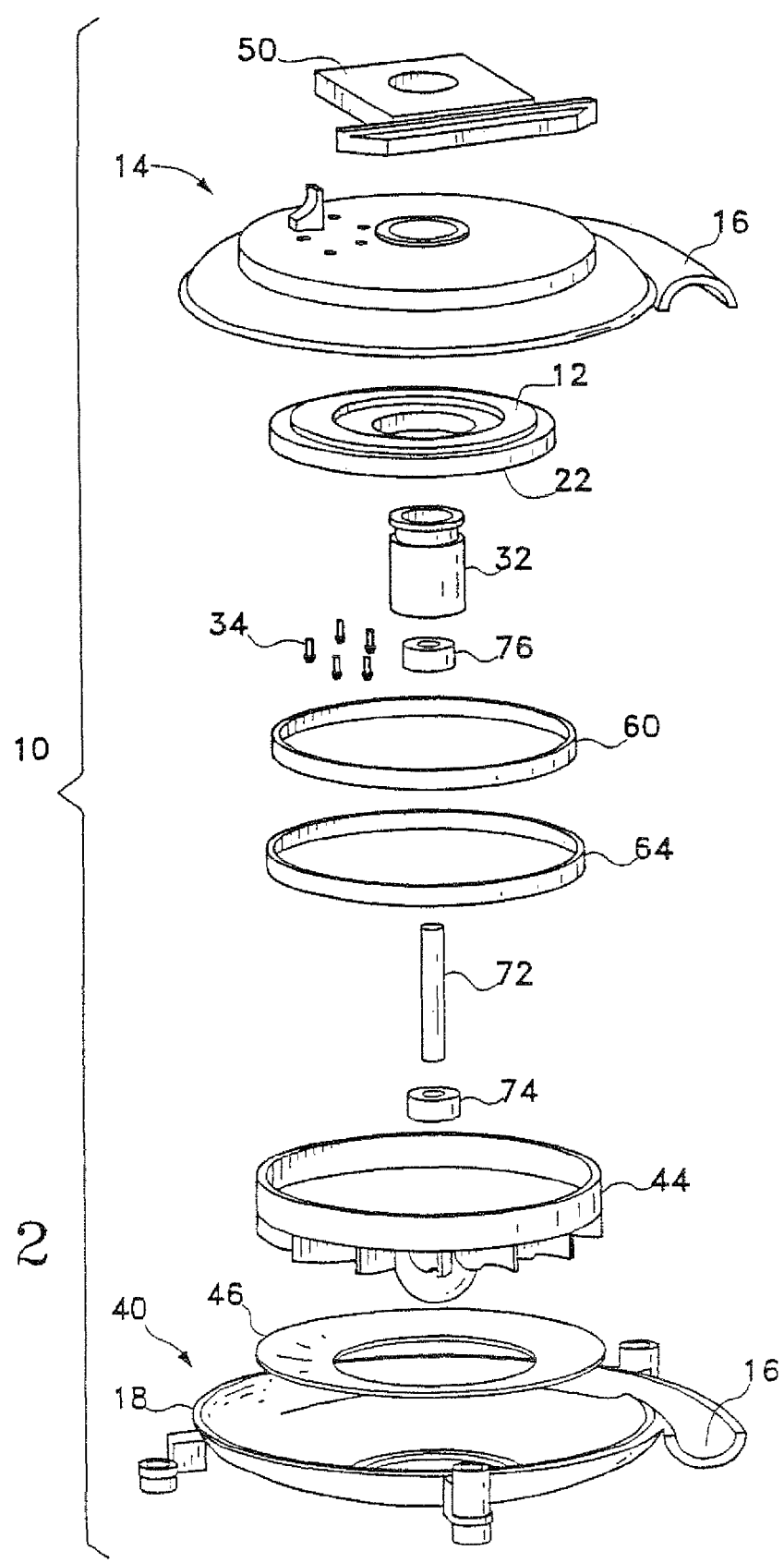
FIG. 2 is a second exploded perspective view of the d.c. brushless motor of FIG. 1.
Figure 3:
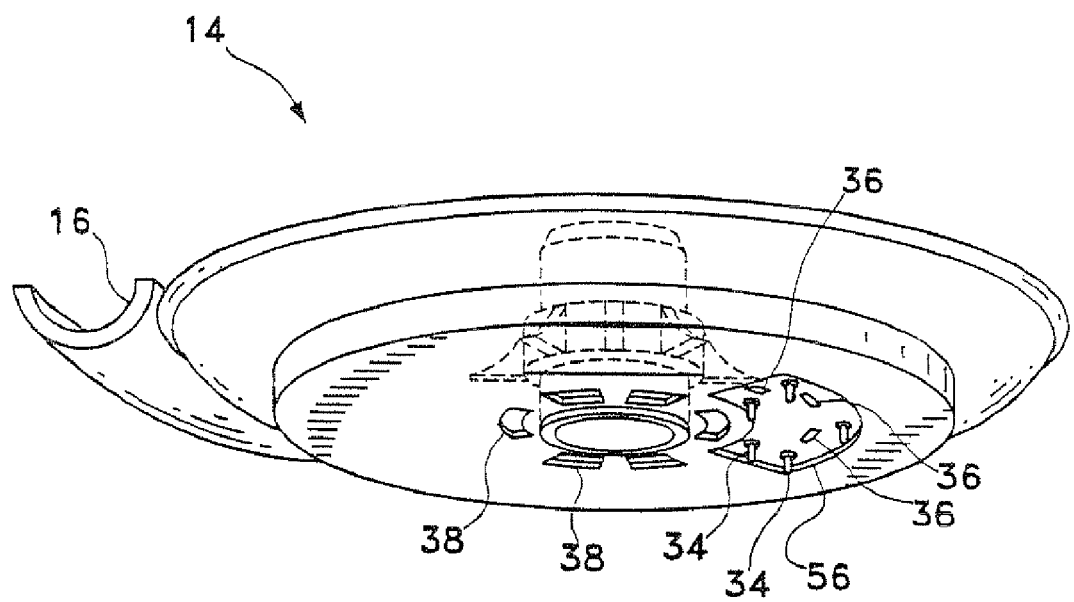
FIG. 3 is a bottom perspective view of an exemplary integrally molded motor housing base portion suitable for use in the d.c. brushless motor of FIG. 1.
Figure 4:
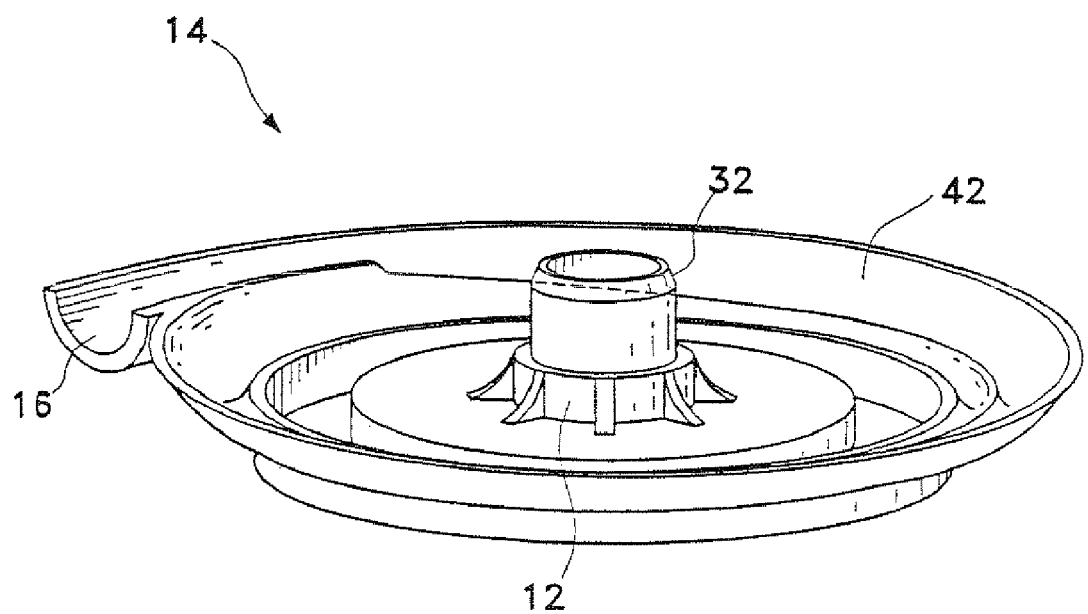
FIG. 4 is a top perspective view of the motor housing base portion of FIG. 3.
Figure 7:
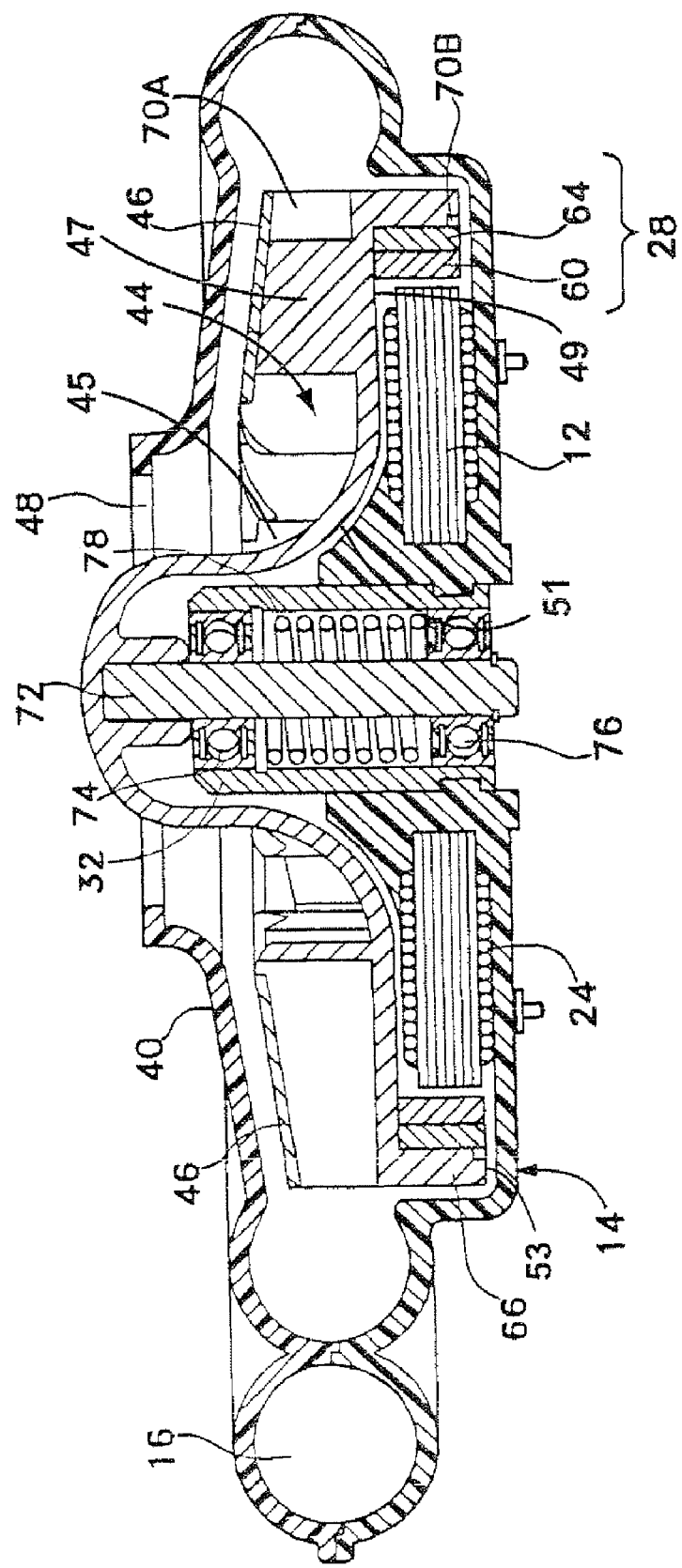
FIG. 7 is a cross-sectional view of a second exemplary d.c. brushless motor corresponding generally to section lines 7-7 of FIG. 5.

As shown in FIG. 1, which is a first exploded perspective view of an exemplary d.c. brushless motor in accordance with the present invention and as shown in more detail in the second exploded perspective view of FIG. 2, the top perspective view of FIG. 3, the bottom perspective view of FIG. 4, and the cross-sectional view of FIG. 7, a preferred embodiment of the present invention may include a generally ring-shaped stator assembly 12 for a d.c. brushless motor 10 is injection molded as an integral part of a motor base housing 14 having the lower portion of an exit volute 16 about its outer periphery 18. The mating upper portion of the assembly, or cover 40, may contain certain completing features of the volute as it does in this exemplary d.c. brushless motor, or it may be a simple cover with an inlet hole.

The exemplary stator assembly 12 (see also FIG. 8) includes a plurality of radially extending slots collectively defining a like number of rotor teeth 20 about an outer circumference 22 of the stator assembly, and a respective low profile layer electrical winding 24 wound about an intermediate portion of each of the teeth 20 between two adjacent slots for selectively magnetizing a respective tooth of the stator assembly 12. Such a stator assembly may be constructed, for example, from M19 silicon steel laminations, low viscosity adhesive such as Loctite® (ethyl cyanoacrylate), copper magnet wire windings, and 3M® Scotchcoat® electrical resin. The entire stator assembly 12 is preferably integrally molded into the base housing 14 by embedding it in the same injection moldable engineered thermoplastic material such as polycarbonate (which may be loaded with glass fibers or other materials for added strength or thermal conduction purposes) from which the base housing 14 is formed. In accordance with another embodiment of the present invention, the laminated stack which defines the individual arms 20 and associated stator slots and stator teeth, and which provides the flux-carrying medium within the stator assembly 12 between two adjacent teeth, may be replaced with a powdered metal stack (not shown).

Figure 8:
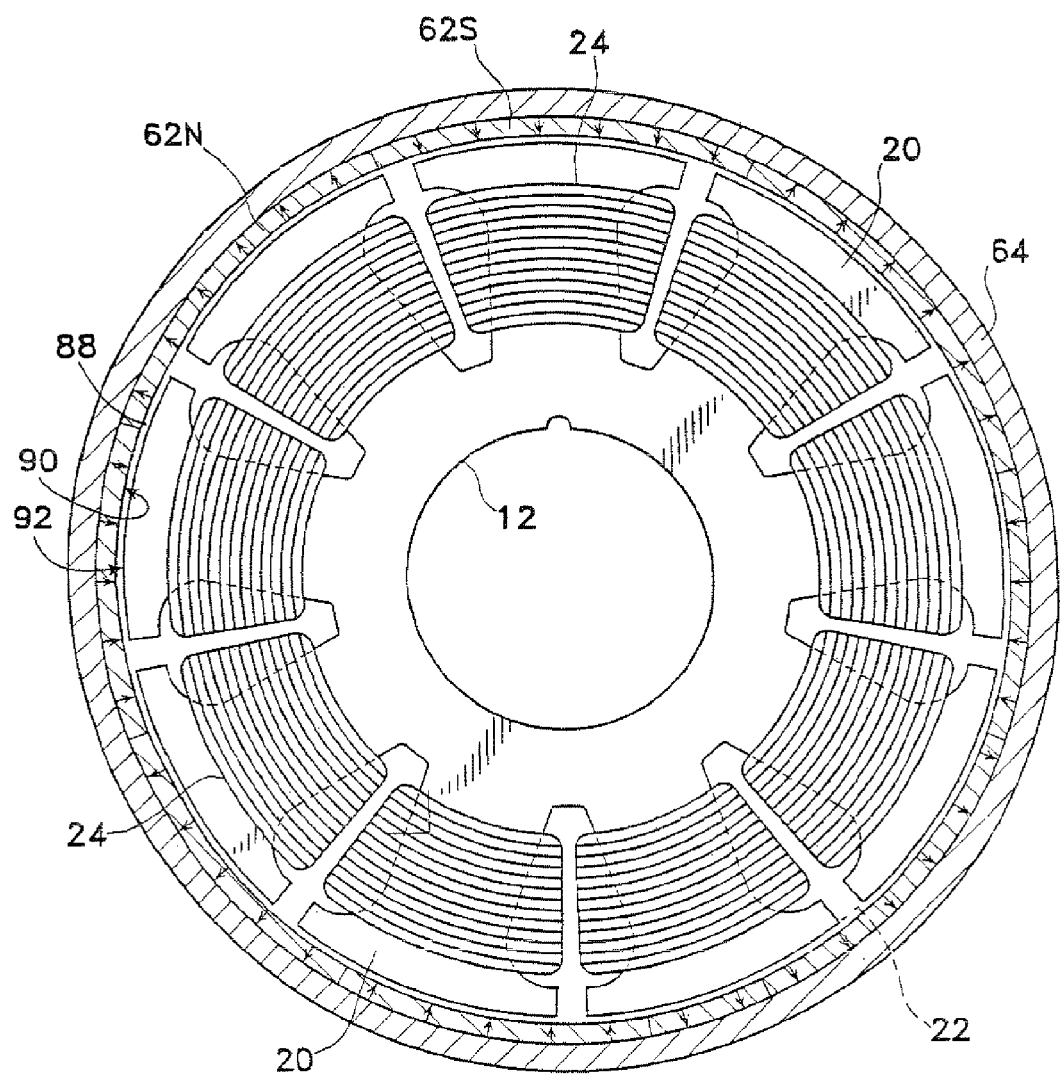
FIG. 8 is a cross-sectional view of an exemplary stator corresponding generally to section lines 8-8 of FIG. 1 and associated rotor and back-iron ring.

In one practical embodiment as shown in FIG. 8, the d.c. brushless motor may utilize a unitary rotor 28 with eight poles and a slotted stator 12 with nine teeth. However, alternative pole/slot combinations may be employed.

As shown in FIG. 3 and FIG. 4, a generally tubular precision bearing carrier 32, which may be made, for example, from 303 stainless steel, a plurality of electrical terminals 34, and a plurality of optional Hall sensor pockets 36 are preferably also embedded as integral parts of the injection molded base housing 14 by properly positioning them in the base housing mold (not shown) at the same time as the stator assembly 12. This injection molding of the base housing 14 with an embedded stator assembly 12 and embedded precision bearing carrier 32 not only reduces motor assembly time, but maintains the static and rotating components in the proper radial and angular spatial relationships during final assembly and operation. In other embodiments, the bearing carrier 32 may be made from the same engineered plastic material as the housing base 14 either as a separate component or as an integral part of the base housing. Those skilled in the art will recognize that the stator 12 and any other separately fabricated components of the integrally molded assembly may be accurately positioned within the mold by means of suitable fixtures or protrusion in the mold corresponding to housing apertures 38 in the finished base.

The depicted embodiment of the d.c. brushless motor 10 of the present invention also includes a motor cover 40 with an upper volute portion 42 that is adapted to attach or snap into place over the motor base housing 14 to thereby define a complete peripheral volute which functions as the exit of the rotating impeller assembly 44. A generally ring-shaped shroud 46, which may contain a contour that mirrors that of the lower volute and thereby forms part of a flow cutoff feature, is preferably coupled between the motor cover 40 and the impeller 44 to form an annular entrance 48 to the rotating impeller assembly. The shroud 46 may be made, for example, from 6061-T6 aluminum or molded from thermoplastic material. The motor cover 40 and base housing 14 may be molded from Noryl® which is modified polyphenylene oxide and polyphenylene ether with good heat resistance, extremely low water absorption (0.07%), and long term dimensional stability.

Figure 5:
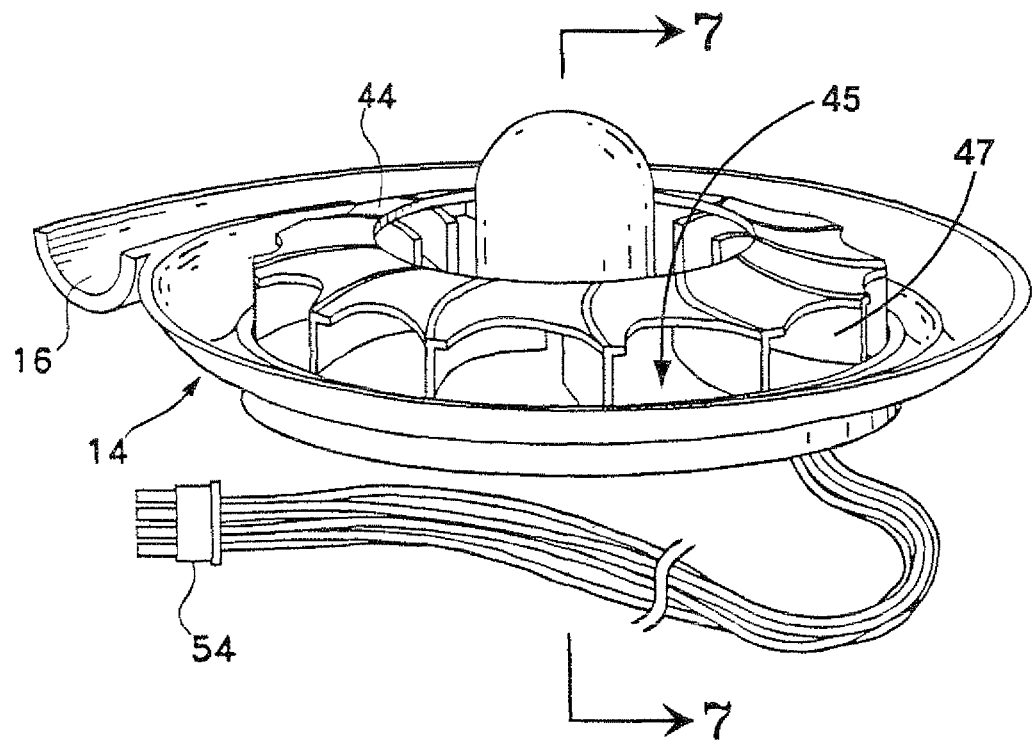
FIG. 5 is a top perspective view of a partially assembled d.c. brushless motor of FIG. 1.
Figure 6:
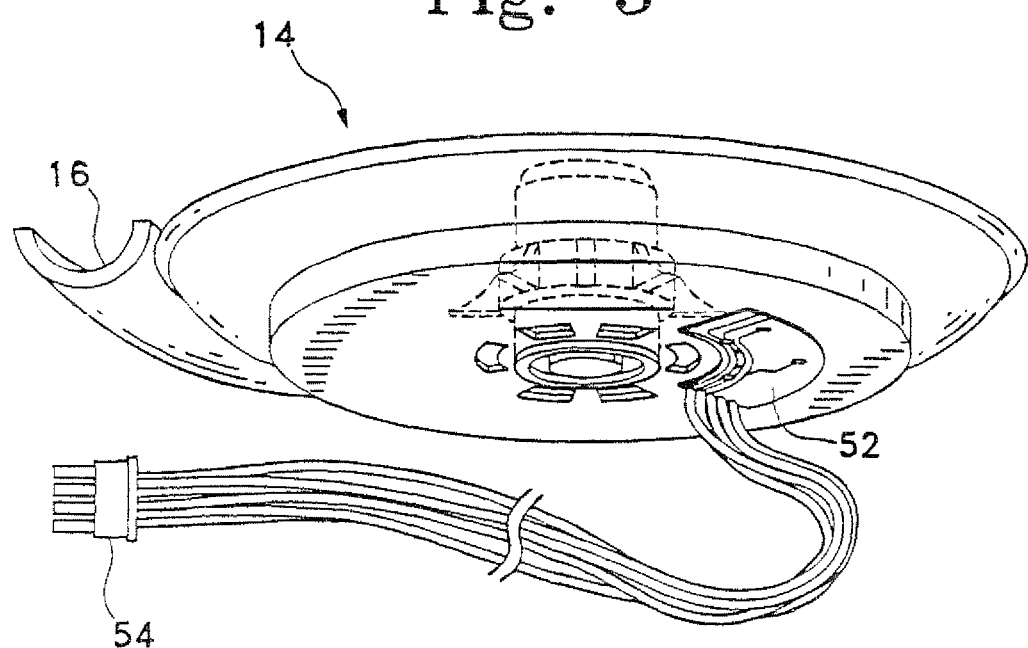
FIG. 6 is a bottom perspective view of the partially assembled d.c. brushless motor of FIG. 5.

As depicted in FIG. 5 and FIG. 6, the exemplary motor 10 may also include a printed circuit board (PCB) driver assembly 50 which is preferably coupled to the bottom portion of the motor housing and which may include a commutation circuit board 52, or for sensorless configurations this board may be simplified by eliminating Hall sensors and their associated pockets. As depicted the commutation circuit board includes a power connector 54 and is adapted to fit within a recess 56 (FIG. 3) on the bottom portion of the motor housing 14. The recess includes the molded-in electrical terminals 34 which operatively couple the commutation circuit board 52 to the integrated stator assembly 12, and which, in one exemplary preferred embodiment of the present invention, are precisely positioned in both angular position and radial alignment with angular position being defined relative to the coils 20, while radial alignment may be defined relative to the rotational axis. The PCB driver assembly 50 is preferably designed with this "in the mold" terminal-locating (preset "tuning" of the Hall sensors) technique to ensure that the combination of PCB driver 50 and molded stator 12 assemblies yields the desired positional relationship of integral Hall sensors to coils, with the integral Hall sensors 58 preferably disposed in the Hall sensor pockets 36.

As best seen in FIG. 7 and FIG. 8, the motor 10 also includes a generally cup-shaped rotor assembly 28 comprising a generally ring-shaped rotor magnet 60 having a number (for example, eight) of radially oriented poles which is preferably incorporated into an integral generally cup-shaped impeller 44 together with a generally ring-shaped rotor hub back-iron ring 64 of magnetic steel (or other suitable ferromagnetic material) to thereby provide a magnetic return path between two adjacent poles of the rotor magnet, as shown by the dashed lines in FIG. 8. A person skilled in the art would readily recognize that the aforementioned preset tuning is advantageous in terms of (a) eliminating labor (tuning process), and (b) assuring consistency of performance among all assemblies. In particular, the individual Hall sensors 58 will be optimally located radially relative to rotor magnet 60 to detect the approach of the next rotor pole 62 at a known angular position relative to a given stator tooth 20 and thereby provide an accurate positional feedback signal to the commutation circuit board 52. The impeller 44 has a circular base rim 66 adapted to accommodate the rotor magnet 62 and is operatively coupled to the motor housing, as generally illustrated in FIG. 5. The rotor magnet 60 may be formed of a suitable permanent magnetic material such as ceramic or high energy rare earth materials, for example a high energy ferromagnetic boron ally such as NdFeB, and is slightly smaller in diameter than the diameter of the rotor hub which, in turn, is made slightly smaller than the inner diameter of the impeller base rim. Specifically, in this example, the back-iron ring 64 is preferably embedded in the inner surface 68 of the base rim 66 of the impeller 44 (as best seen in the cross-section of FIG. 7), and the rotor magnet 60 (which could be damaged during the molding process) is preferably adapted to be subsequently adhesively secured within the back ring 64. However, in other embodiments constructed of other materials and/or fabricated using other molding techniques, both the back ring 64 and the magnetic rotor could be adhesively secured to the impeller or integrally molded therewith. In any event, a two-plane balance is preferably performed on the integral impeller assembly after the back ring and magnetic rotor have been installed, for example by removal of material from the exemplary locations 70A, 70B.

In accordance with an exemplary embodiment of the present invention, the impeller 44 may be molded from a suitable thermoplastic; the rotor magnet 62 may be a bonded ferrite magnet, while the rotor hub 28 may be constructed from 416 stainless steel. In another exemplary embodiment, the impeller 44 may be constructed from 6061-T6 aluminum. The impeller includes a front side having vanes 47 for moving air flow through the impeller. The impeller has a back side 49 with a recess 51 that extends into the interior of the impeller. The bearing carrier 32 and stator assembly 12 extend into recess on the back side of the impeller. The back side 49 of the impeller includes an outer edge 53.

As best seen in FIG. 7, the motor 10 includes a generally cylindrical motor shaft 72 adapted to rotate on front and rear bearings 74,76 which are within the precision bearing carrier and preloaded via a compression spring 78. Similar to the bearing carrier 32 in the housing base, the shaft 72 is preferably embedded as an integral part of the injection molded motor cover 40 during the injection molding process. As best seen in FIG. 1, a generally ring-shaped shim 80 may be coupled between the compression preload spring 78 and the front bearing 74. On the opposite side, a housing snap ring 82 may be coupled between the rear bearing 76 and the compression preload spring 78. A shaft snap ring 84 may be used between the precision bearing carrier 32 and the stator assembly 12. By thus providing a precision bearing assembly about the rotational axis 86 defined by the bearing carrier 32 and the motor shaft 72, and by integrally molding the bearing carrier 32 with the stator assembly 12 and by integrally molding the motor shaft 72 and the back ring 64 (which supports the rotor magnet 60) with the rotor assembly 28, it is possible to maintain a relatively small air gap 88 between the inner circumference 90 of the ring-shaped rotor magnet 60 and the ends 92 of the radial stator arms 20 which define the outer circumference 22 of the stator assembly 12.

In accordance with an exemplary embodiment of the present invention, the front and rear bearings 74,76 may be made from chrome alloy steel, the shim 80 may be made from 300 stainless steel, the housing snap ring 82 may be made from carbon steel, the shaft snap ring 84 may be made from beryllium-copper alloy, and the compression preload spring 78 may be made from spring steel.

The resultant motor has relatively low motor length (L) to overall motor diameter (D) ratio and may be used in a variety of applications. In accordance with one exemplary embodiment of the present invention, an L/D ratio of about ¼ was achieved using a motor length of about 1.25 inch, and an overall motor diameter (including peripheral volute) of about 5 inch. Other L/D ratios may be utilized depending on specific rotary pump applications. For example, the (low L/D ratio) motor of the present invention may be used as a CPAP (continuous positive airway pressure) device for OSA (obstructive sleep apnea) patients.

It should be noted that practicing the invention is not limited to the applications described hereinabove. Many other applications and/or alterations may be utilized provided such other applications and/or alterations do not depart from the intended purpose and scope of the present invention. For example, the disclosed motor may be used to drive other rotating mechanisms such as a mechanical gyroscope or an optical scanner.

It should also be appreciated that features illustrated or described as part of one embodiment can be used in another embodiment to provide yet another embodiment such that the features are not limited to the specific embodiments described above. Thus, it is intended that the present invention cover all such modifications, embodiments and variations as long as they come within the scope of the present invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An impeller mechanism incorporating a brushless dc motor comprising:
   a molded housing defining an internal axis of rotation and a lower portion of a peripheral volute;
   a stator assembly integrally molded within a base portion of the housing in an annular region between the axis and the volute, wherein the stator assembly includes a plurality of radially extending teeth arranged in a circle which is concentric to the internal axis, wherein the stator assembly also includes a respective electrical winding about the teeth;
   a hollow bearing support concentric with the internal axis and extending through the stator assembly towards an interior of the housing;
   a brushless rotor assembly including a plurality of radially oriented permanently magnetized poles in a circle, the rotor assembly proximate and concentric to the magnetizable teeth of the stator assembly;
   a cylindrical air gap concentric with the internal axis and extending radially between the rotor assembly and the stator assembly,
   a hat-shaped rotor support disposed about the internal axis and above the stator assembly,
   an impeller assembly disposed on a side of the rotor support, the impeller assembly includes a front side having a central air inlet and an impeller vane extending towards a circumference of the impeller assembly from the center air inlet, and a back side having a recess into which extends at least a portion of the stator assembly;
   a rotating shaft concentric with said internal axis and extending from an interior portion of the hollow bearing support to the hat-shaped rotor support, and
   a bearing assembly between an interior surface of the hollow bearing support and an outer surface of the rotating shaft, wherein the bearing assembly includes a first bearing and a second bearing which are coaxial to and rotatably support the rotating shaft, the first bearing is entirely above a first plane and the impeller vane is entirely below the first plane, and a second plane extends through the second bearing and the winding of the stator assembly.

2. The impeller mechanism of claim 1 wherein the circumference of the stator assembly is an outer circumference and the rotor assembly surrounds the outer circumference of the stator assembly.

3. The impeller mechanism of claim 1 further comprising a ferromagnetic back-iron ring surrounding the rotor assembly for providing a flux return path between two adjacent poles of the rotor assembly, wherein the rotor support includes an outer lip surrounding the back-iron ring.

4. The impeller mechanism of claim 3 wherein the hat shaped support is integrally molded about the back-iron ring and the rotating shaft.

5. The impeller mechanism of claim 4, wherein the ring shaped rotor assembly is secured to an inner circumference of the back-iron ring after the downwardly extending lip portion of the hat shaped support has been molded about an outer circumference of the back-iron ring.

6. The impeller mechanism of claim 4, wherein the ring shaped rotor assembly is secured to the back-iron ring after the back-iron ring has been secured to the downwardly extending lip portion of the hat shaped support.

7. The impeller mechanism of claim 4, wherein at least a portion of the volute is integrally molded with the base portion of the housing, and at least a portion of the impeller is integrally molded with hat shaped rotor support.

8. The impeller mechanism of claim 1 wherein an overall length of the mechanism along the axis from the bottom of the housing to the top of the crown portion of the rotating support is substantially less than an diameter of the peripheral volute.

9. A brushless motor mechanism comprising:
   a stator portion including:
      a stator housing including a base portion defining an internal axis of rotation and at least a lower portion of a peripheral volute,
      a stator assembly secured within the stator housing about the internal axis, the stator assembly including a plurality of radially extending magnetizable teeth collectively defining an edge of the stator assembly concentric with the internal axis and at a common radius from the axis, the stator assembly includes a respective electrical winding about each of the teeth for selectively magnetizing the individual teeth of the stator assembly, and
      a fixed bearing support concentric with the internal axis and extending through the stator assembly into the housing, and
   a rotor portion further comprising:
      a brushless rotor assembly including a plurality of radially oriented permanently magnetized poles in a circle, the rotor assembly in close proximity and concentric to the selectably magnetizable poles of the stator assembly and adjacent an annular air gap concentric with the internal axis, wherein the air gap forms an annulus extending radially from the internal axis between the rotor assembly and the stator assembly;
      a rotating support above the stator assembly, wherein the rotating support has a crown portion coaxial with the internal axis and an annular brim extending radially out from the crown portion, wherein a front side of the brim includes at least one impeller vane;
      a rotating bearing support concentric with the fixed bearing support and extending along the axis into the crown portion of the rotating support, and
      a bearing assembly between the fixed bearing support and the rotating bearing support, wherein the bearing assembly includes a first bearing and a second bearing which are coaxial to and rotatably support the rotating shaft, the first bearing is entirely above a first plane and the impeller vane is entirely below the first plane, and a second plane extends through the second bearing and the winding of the stator assembly, and wherein the housing is molded about the fixed bearing support and the stator assembly, the rotating support is molded about the rotating bearing support, at least a lower portion of a peripheral volute is integrally molded with at least the base portion of the housing, and an annular impeller integrally molded with the rotating support, the impeller assembly is disposed on an upper side of the annular brim portion of the rotating support, wherein an upper portion of the housing and the crown portion of the rotating support define an annular air inlet to the impeller, and an outer circumference of the impeller assembly is adjacent the peripheral volute.

10. The brushless motor mechanism of claim 9 further comprising a ferromagnetic back-iron ring surrounding an outer surface of the rotor assembly for providing a flux return path between two adjacent poles of the rotor assembly, wherein the rotating support including a raised crown portion, and the rotating support also includes a downwardly extending outer lip secured to the back-iron ring.

11. The brushless motor mechanism of claim 9 wherein the first and second bearings each include preloaded ball bearing races.

12. An impeller mechanism incorporating a brushless dc motor, said mechanism comprising:
    a fixed portion further comprising:
        a molded housing defining an axis of rotation and a lower portion of a peripheral volute,
        a separately fabricated stator assembly integrally molded within a base portion of the housing in an annular region between the axis and the volute, the stator assembly including a plurality of magnetizable teeth collectively defining a perimeter of the stator assembly, and a respective electrical winding about each of the teeth for selectively magnetizing the individual teeth of the stator assembly, and
        a hollow bearing support concentric with the axis and extending through the stator assembly into the housing, and
    a rotating portion further comprising:
        brushless rotor assembly including a plurality of radially oriented permanently magnetized poles arranged in a circle, the rotor assembly in close proximity and concentric to the selectably magnetizable teeth of the stator assembly and separated therefrom by a cylindrical air gap concentric with a central axis, wherein the magnetized poles of the rotor assembly are in a plane extending through the magnetizable teeth of the stator assembly and perpendicular to the axis;
        an impeller assembly disposed on an upper side of the rotor assembly wherein the impeller assembly includes a backside having a recess which receives the rotor assembly,
        wherein the impeller assembly includes an impeller vane extending over the magnetizable teeth in the stator assembly and the magnetized poles of the rotor assembly, and a plane perpendicular to the axis of rotation extends through the impeller vane, the rotor assembly, and the bearing support;
        a rotating shaft concentric with said axis and extending from an interior portion of the hollow bearing support into the rotor assembly and impeller assembly, and
        a bearing assembly coupled between an interior surface of the hollow bearing support and an outer surface of the rotating shaft, wherein the bearing assembly extends into the recess in the backside of the impeller assembly such that a second plane perpendicular to the axis of rotation extends through the bearing assembly and above the impeller blade.

13. A method of constructing a brushless motor mechanism, comprising the steps:
    forming a stator assembly including a plurality of radially extending magnetizable teeth collectively defining an edge of the stator assembly, the stator assembly also including a respective electrical winding about each of the teeth for selectively magnetizing the stator assembly and a plurality of electrical terminals for selectively activating said windings;
    forming a hollow bearing support defining a first axis;
    supporting the stator assembly concentrically about the first axis in a predetermined angular orientation;
    molding a housing base portion and at least a portion of an integral volute about the hollow bearing support and the supported stator assembly to form a first molded portion of the rotating mechanism with the hollow bearing support extending through the stator assembly into the base portion;
    forming a shaft defining a second axis;
    molding a rotating support and at least a portion of an integral impeller about the shaft and the to form a second molded portion of the rotating mechanism with the shaft extending into the interior of the rotating support, wherein the impeller has a front surface with a vane between a center air inlet aligned with the shaft and the integral volute;
    forming a brushless rotor assembly including a plurality of radially oriented permanently magnetized poles arranged about a cylindrical surface of the rotor assembly;
    securing the rotor assembly to an inner circumference of the back-iron ring within the second molded portion to thereby form a rotating assembly with a flux return path between two adjacent poles of the rotor assembly, and
    disposing a first bearing and a second bearing between the shaft and the hollow bearing support to couple the first molded portion to the rotating assembly, wherein the first bearing is entirely above a first plane and the impeller vane is entirely below the first plane, and a second plane extends through the second bearing and the winding of the stator assembly, and
    wherein the first axis is coaxially aligned with the second axis with the rotor assembly and the stator assembly separated radially by an annular air gap concentric with the axis.

* * * * *